(12) United States Patent
Awano

(10) Patent No.: US 8,238,930 B2
(45) Date of Patent: Aug. 7, 2012

(54) HOME NETWORK SYSTEM AND MOBILITY ANCHOR ALLOCATION METHOD USED IN THE HOME NETWORK SYSTEM

(75) Inventor: Jun Awano, Tokyo (JP)

(73) Assignee: NEC Corporation, Tokyo (JP)

( * ) Notice: Subject to any disclaimer, the term of this patent is extended or adjusted under 35 U.S.C. 154(b) by 520 days.

(21) Appl. No.: 12/518,151

(22) PCT Filed: Dec. 12, 2007

(86) PCT No.: PCT/JP2007/073949
§ 371 (c)(1),
(2), (4) Date: Jun. 8, 2009

(87) PCT Pub. No.: WO2008/072660
PCT Pub. Date: Jun. 19, 2008

(65) Prior Publication Data
US 2010/0008319 A1   Jan. 14, 2010

(30) Foreign Application Priority Data
Dec. 13, 2006 (JP) ................................. 2006-336058

(51) Int. Cl.
H04W 72/00 (2009.01)
H04W 4/00 (2009.01)
G06F 15/173 (2006.01)
(52) U.S. Cl. .................... 455/453; 455/435.2; 370/331; 709/226
(58) Field of Classification Search .................. 455/453, 455/435.2; 370/331, 338; 709/226
See application file for complete search history.

(56) References Cited

U.S. PATENT DOCUMENTS
7,590,420 B1 * 9/2009 Zaghloul et al. ........... 455/435.2

FOREIGN PATENT DOCUMENTS
| JP | 1998105500 A | 4/1998 |
| JP | 2004207851 A | 7/2004 |
| JP | 2005027315 A | 1/2005 |
| JP | 2006228115 A | 8/2006 |
| WO | 2004105329 A | 12/2004 |
| WO | WO 2005060161 A1 * | 6/2005 |

OTHER PUBLICATIONS
International Search Report for PCT/JP2007/073949 mailed Mar. 11, 2008.

* cited by examiner

Primary Examiner — Jinsong Hu
Assistant Examiner — Opiribo Georgewill

(57) ABSTRACT

A home network system in which an appropriate mobility anchor is allocated for a mobile node and the number of mobility anchors can be reduced. A subscriber information accumulation server accumulates first communication load prediction data for each time of a mobile node. An anchor information accumulation server accumulates second communication load prediction load for each time of each mobility anchor. When "a mobility anchor allocation request" is transmitted from the mobile node to an anchor allocation server, the anchor allocation server adds the first communication load prediction data and the second communication load prediction load data so as to obtain third communication load prediction data. Among a plurality of mobility anchors, a mobility anchor in which the third communication load prediction data is not greater than the load upper limit value at all the times and the maximum value of the second communication load prediction data is minimum is selected and allocated.

4 Claims, 13 Drawing Sheets

FIG. 2

SUBSCRIBER INFORMATION TABLE

| No. | SUBSCRIBER ID | MOBILE NODE ID | HoA | RATE PLAN | OCCUPATION | AGE |
|---|---|---|---|---|---|---|
| 1 | UID_A | MNID_A | HOA_A | NIGHT ECONOMY PLAN | OFFICE WORKER | 20~29 |
| 2 | UID_B | MNID_B | HOA_B | DAY ECONOMY PLAN | UNEMPLOYED | 60~69 |
| 3 | UID_C | MNID_C | HOA_C | TELEPHONE CALL FLAT RATE PLAN | STUDENT | 10~19 |
| ... | ... | ... | ... | ... | ... | ... |

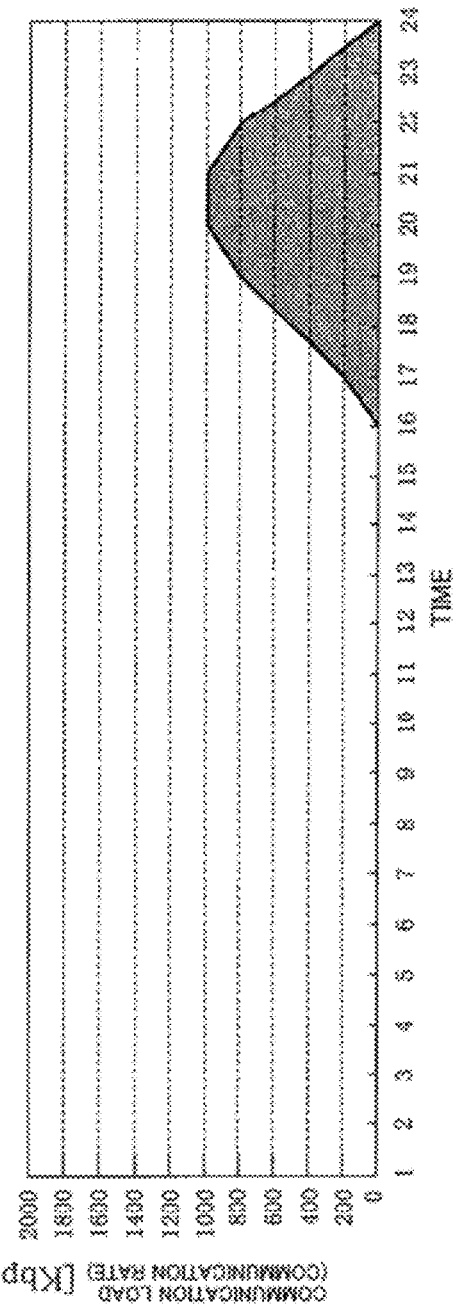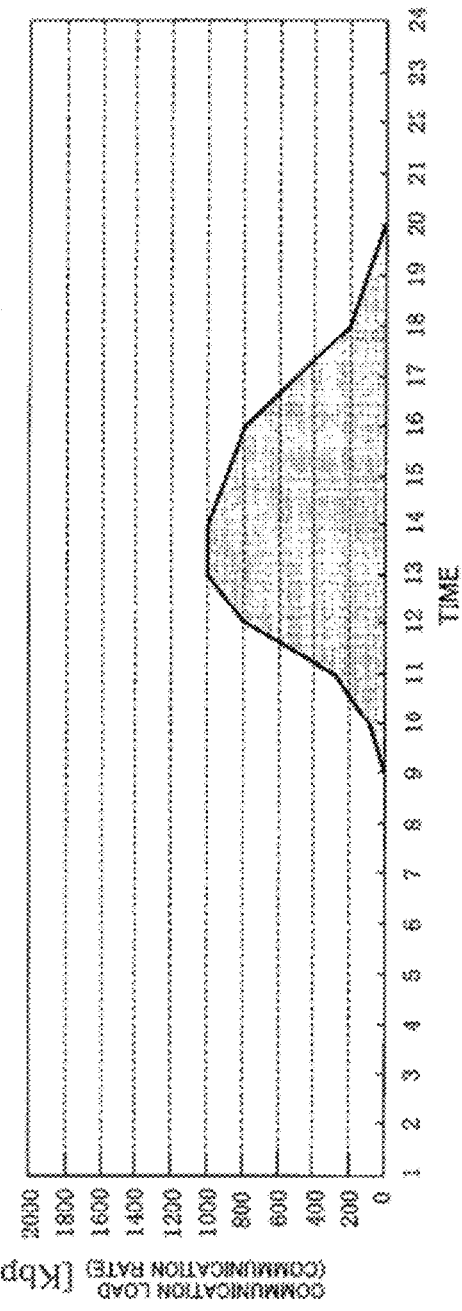

FIG. 5

ANCHOR INFORMATION TABLE

| No. | MOBILITY ANCHOR ID | IP ADDRESS | MAXIMUM LOAD | ACCOMMODATED MOBILE NODES |
|---|---|---|---|---|
| 1 | AncID_A | AncAddr_A | MaxLoad_A | MNID_B, MNID_C, MNID_E, MNID_G, ... |
| 2 | AncID_B | AncAddr_B | MaxLoad_B | MNID_A, MNID_D, MNID_F, ... |
| 3 | AncID_C | AncAddr_C | MaxLoad_C | MNID_H, MNID_J, MNID_K, ... |
| ... | ... | ... | ... | ... |

FIG. 9

SUBSCRIBER INFORMATION TABLE

| No. | SUBSCRIBER ID | MOBILE NODE ID | HoA | RATE PLAN | FRIEND | OCCUPATION | AGE |
|---|---|---|---|---|---|---|---|
| 1 | UID_A | MNID_A | HOA_A | NIGHT ECONOMY PLAN | UID_X | OFFICE WORKER | 20~29 |
| 2 | UID_B | MNID_B | HOA_B | DAY ECONOMY PLAN | UID_Y | UNEMPLOYED | 60~69 |
| 3 | UID_C | MNID_C | HOA_C | TELEPHONE CALL FLAT RATE PLAN | UID_Z | STUDENT | 10~19 |
| ... | ... | ... | ... | ... | ... | ... | ... |

HOME NETWORK SYSTEM AND MOBILITY ANCHOR ALLOCATION METHOD USED IN THE HOME NETWORK SYSTEM

FIELD OF THE INVENTION

This application is the National Phase of PCT/JP2007/073949, filed Dec. 12, 2007, which is based upon and claims the benefit of the priority of Japanese patent application No. 2006-336058 filed on Dec. 13, 2006, the disclosure of which is incorporated herein in its entirety by reference thereto.

The present invention relates to a home network system and mobility anchor allocation method used in the home network system, and for instance, to a home network system and mobility anchor allocation method used in the home network system, which are suitable for use when a mobile telephone network uses IP (Internet Protocol)

BACKGROUND OF THE INVENTION

When mobile nodes such as mobile telephones and personal computers move between each network on an IP network, as a technology that achieves mobility by automating the management of IP addresses and the transfer of communication packets to the destination, there is Mobile IP, standardized by Internet Engineering Task Force (IETF).

FIG. 13 is a schematic diagram for explaining an environment in which the Mobile IP is used. According to this Mobile IP, as shown in FIG. 13, by registering an association between a care-of address (CoA) assigned to the network interface on an external network to which a mobile node 1 connects at its mobility destination and a home address (HoA), which is an address on a home network where the mobile node 1 belongs, to a home agent 2, continuous communication with a communication node 3 can be realized via a network 4 even when a link that the mobile node 1 connects to changes. For instance, when the communication node 3 transmits a packet whose destination is HoA, since the home network is a network where the home agent 2 belongs and the home agent 2 responds with its own link-layer address in a case where a link-layer address for HoA as a proxy of the mobile node 1 is needed while the mobile node 1 exists on the external network, the packet to HoA transmitted by the communication node 3 is sent to the home agent 2 by general routing processing. When the packet to HoA reaches the home agent 2, based on the association information between HoA and CoA that it holds, the home agent 2 encapsulates the packet with the address of the home agent 2 HA_addr as a source address and the address of the mobile node 1 (CoA) as a destination address, and transmits the packet to the mobile node 1.

Further, when the mobile node 1 sends a packet to the communication node 3, the packet will be canceled by an ingress filter if the source address does not belong to the network address in which the mobile node 1 exists. Because of this, the packet having HoA (the address of the mobile node 1) as the source address and the address of the communication node 3 (CN_addr) as the destination address is encapsulated as a packet having CoA (the address of the mobile node 1) as the source address and the address of the home agent 2 (HA_addr) as the destination address and transmitted to the home agent 2 for time being. After releasing the capsulation of the packet, the home agent 2 transfers the packet to the communication node 3. Further, when the network to which the mobile node 1 connects changes thereby changing CoA, the mobile node 1 transmits a registration request for updating the association between HoA and CoA each time. The home agent 2 updates CoA associated with HoA according to the registration request. By the processing described above, continuous communication between the mobile node 1 and the communication node 3 is achieved.

However, in a system in which one single mobility anchor such as the home agent 2 in the mobile IP described above is intensively responsible for transferring packets, the load is concentrated on the mobility anchor. In such a case, the load can be distributed by providing a plurality of identical mobility anchors.

Conventionally, for instance Patent Document 1 describes such a technology.

In a load balance method disclosed in Patent Document 1, communication load information is exchanged between a plurality of home agents on a regular basis, and when one of the home agents has more load than a predetermined amount, the load is distributed by having a mobile node transmit a registration request to another home agent with a smaller load.

Further, regarding a home agent device described in Patent Document 2, on an IP network where a plurality of home agent devices are provided, each home agent device measures the load information of a BC (binding cache), and when a home agent device requests another home agent device to transfer a BC, the home agent device that has received the request judges whether or not it accepts the BC based on the BC load on the device at the time and on the load of the BC transferred, and the loads are distributed based on the result of the judgment.

Further, in a mobile communication system described in Patent Document 3, the load status of packet processing devices is monitored by a packet processing representative device, and how communication to/from a mobile body is established is specified based on the current load status. As a result, the loads on the packet processing devices are distributed and the operation efficiency of the system can be improved.

[Patent Document 1]
Japanese Patent Kokai Publication No. JP-P2005-027315A (Abstract, FIG. 2)
[Patent Document 2]
WO2004-105329A1 (Abstract, FIG. 2)
[Patent Document 3]
Japanese Patent Kokai Publication No. JP-P2004-207851A (Abstract, FIG. 2)

SUMMARY OF THE DISCLOSURE

Problems to be Solved by the Invention

The entire disclosures of the above-mentioned Patent Documents 1 to 3 are incorporated herein by reference thereto.

However, in the load balance method described in Patent Document 1, if a great number of mobile nodes such as current mobile phones are accommodated by a home agent, the processing for generating and erasing the registration information will increase the load on the home agent since the number of mobile nodes that need to change their home agents will also be great. Further, if a home agent needs to be changed during communication, the communication will be cut off. Because of these issues, it is necessary to assign a most appropriate home agent when initially home agents are assigned such as when the power is turned on. For instance, there is a method that, when the power of a mobile node is turned on, assigns a home agent with a small load, taking the load on each home agent at the time into consideration.

However, the home agent may already have been accommodating many mobile nodes even if it has a small communication load at the time of the assignment, and there is a possibility that the load exceeds the allowable communication load of the home agent when communication is performed if the communication timing of each mobile node is similar to each other. Because of this, in a case where the mobile node performs communication only for a short period of time while the power is turned on (for instance mobile telephones), the home agents cannot be appropriately assigned based on the communication load information taken at an instant such as the moment of power-on. Meanwhile, if the number of mobile nodes that can be accommodated by a home agent is estimated to be a value obtained by dividing the permissible communication load of a home agent by the maximum communication load of one mobile node, the number of mobile nodes accommodated by a home agent will decrease and the number of the home agents installed will increase. As a result, the hardware structure of the device will be larger, and installation and management cost will increase.

In the home agent device described in Patent Document 2, when a home agent device requests another home agent device to transfer a BC, the home agent device that has received the request judges whether or not it accepts the BC based on the BC load on the device at the time and on the load of the BC transferred. Therefore, the device has similar problems as Patent Document 1 described above.

In the mobile communication system described in Patent Document 3, since how communication to/from a mobile body is established is specified based on the current load status, it has similar problems as Patent Document 1 described above.

The present invention has been created in order to solve the above problems, and it is an object of the present invention to provide a home network system and mobility anchor allocation method used in the home network system in which an appropriate mobility anchor is allocated for a mobile node and the number of mobility anchors can be reduced.

Means to Solve the Problems

According to a first aspect of the present invention, there is provided a home network system having a plurality of mobility anchors that accommodate a plurality of mobile nodes, register a corresponding relationship between a home address assigned to each of the mobile nodes on a home network to which each of the mobile nodes accommodated belongs and a care-of address assigned to each of the mobile nodes on an external network to which each of the mobile nodes connects at its mobility destination, and when each of the mobile nodes is connected to the external network and a packet destined to each of the mobile nodes is received, transfer the packet to each of the mobile nodes based on the corresponding relationship between the addresses; and anchor allocation means for dynamically allocating any one of the plurality of mobility anchors to each of the mobile nodes. In this home network system, mobile node information accumulation means for accumulating first communication load prediction data predicting communication load values of each of the mobile nodes at a plurality of time points, and anchor information accumulation means for accumulating second communication load prediction data predicting communication load values of each of the mobility anchors at the plurality of time points are provided; and the anchor allocation means derives third communication load prediction data predicting communication load values of each of the mobility anchors at the plurality of time points when a relevant mobile node is accommodated based on the first communication load prediction data and the second communication load prediction data, and among the plurality of mobility anchors, selects and allocates a mobility anchor, having the third communication load prediction data not greater than a predetermined load upper limit value at all the time points and the smallest maximum value of the second communication load prediction data, to the relevant mobile node.

According to a second aspect of the present invention, relating to the home network system described above, there is provided a home network system in which the mobile node information accumulation means is constituted by a subscriber information accumulation server that accumulates the first communication load prediction data corresponding to communication tendencies of a subscriber of each of the mobile nodes; the anchor information accumulation means is constituted by an anchor information accumulation server that accumulates the second communication load prediction data; and the anchor allocation means is constituted by an anchor allocation server that, when each of the mobile nodes transmits a mobility anchor allocation request, derives the third communication load prediction data by adding the first communication load prediction data and the second communication load prediction data, and among the plurality of mobility anchors, selects and allocates a mobility anchor, having the third communication load prediction data not greater than the load upper limit value at all the times and the smallest maximum value of the second communication load prediction data, to the relevant mobile node.

According to a third aspect of the present invention, relating to the home network system described above, there is provided a home network system in which the subscriber information accumulation server sets an initial value of the first communication load prediction data according to communication tendencies of a subscriber of each of the mobile nodes, and sequentially updates the first communication load prediction data according to an actual communication load history; and the anchor information accumulation server sequentially updates the second communication load prediction data according to an actual communication load history.

According to a fourth aspect of the present invention, relating to the home network system described above, there is provided a home network system in which the subscriber information accumulation server records a mobile node ID of a frequently communicating partner who frequently communicates with a subscriber of each of the mobile nodes, and each of the mobility anchors selects and accommodates mobile nodes that frequently communicate with each other based on the mobile node ID of the frequently communicating partner and an actual communication load history corresponding to the mobile node ID.

According to a fifth aspect of the present invention, there is provided a home network system comprised of the home network systems described above connected to each other via a plurality of networks, in which, when a mobility anchor of the home network system is allocated to a mobile node having the first communication load prediction data accumulated in the mobile node information accumulation means of a different home network system from the home network system, the anchor allocation means of each of the home network systems accesses the different home network system via the networks and refers to the first communication load prediction data corresponding to the mobile node.

According to a sixth aspect of the present invention, there is provided a home network system comprised of the home network systems described above connected to each other via a plurality of networks, in which, when a mobility anchor of the home network system is allocated to a mobile node having the first communication load prediction data accumulated in the mobile node information accumulation means of a different home network system from the home network system, the anchor allocation means of each of the home network systems accesses the different home network system via the networks and has communication results of the mobile node in the home network system reflected on its first communication load prediction data.

According to a seventh aspect of the present invention, there is provided a mobility anchor allocation method used in a home network system having a plurality of mobility anchors that accommodate a plurality of mobile nodes, register a corresponding relationship between a home address assigned to each of the mobile nodes on a home network to which each of the mobile nodes accommodated belongs and a care-of address assigned to each of the mobile nodes on an external network to which each of the mobile nodes connects at its mobility destination, and when each of the mobile nodes is connected to the external network and a packet destined to each of the mobile nodes is received, transfer the packet to each of the mobile nodes based on the corresponding relationship between the addresses; and anchor allocation means for dynamically allocating any one of the plurality of mobility anchors for each of the mobile nodes. In other words, the mobility anchor allocation method performs mobile node information accumulation processing that accumulates first communication load prediction data predicting communication load values of each of the mobile nodes at a plurality of time points, and anchor information accumulation processing that accumulates second communication load prediction data predicting communication load values of each of the mobility anchors at the plurality of time points; and the anchor allocation means derives third communication load prediction data predicting communication load values of each of the mobility anchors at the plurality of time points when a relevant mobile node is accommodated based on the first communication load prediction data and the second communication load prediction data, and among the plurality of mobility anchors, selects and allocates a mobility anchor, having the third communication load prediction data not greater than a predetermined load upper limit value at all the time points and the smallest maximum value of the second communication load prediction data, to the relevant mobile node.

According to an eighth aspect of the present invention, there is provided a home network system having a plurality of mobility anchors that transfer a packet destined to each of mobile nodes and anchor allocation means for dynamically allocating any one of the plurality of mobility anchors for each of the mobile nodes, and comprising means for deriving third communication load prediction data predicting communication load values of each of the mobility anchors at a plurality of time points when a relevant mobile node is accommodated based on first communication load prediction data predicting communication load values of each of the mobile nodes at the plurality of time points and second communication load prediction data predicting communication load values of each of the mobility anchors at the plurality of time points; and means for selecting and allocating a mobility anchor, among the plurality of mobility anchors, having the third communication load prediction data not greater than a predetermined load upper limit value at any of the plurality of time points and the smallest maximum value of the second communication load prediction data at the plurality of time points, to the relevant mobile node.

Further, according to a ninth aspect of the present invention, there is also provided an anchor allocation server that functions as the anchor allocation means.

Further, according to a tenth aspect of the present invention, there is provided a home network system and a mobility anchor allocation method realized by the home network system having a plurality of mobility anchors that accommodate a plurality of mobile nodes, register a corresponding relationship between a home address assigned to each of the mobile nodes on a home network to which each of the mobile nodes accommodated belongs and a care-of address assigned to each of the mobile nodes on an external network to which each of the mobile nodes connects at its mobility destination, and when a packet destined to each of the mobile nodes is received, transfer the packet to each of the mobile nodes based on the corresponding relationship between the addresses; and anchor allocation means for dynamically allocating any one of the plurality of mobility anchors to each of the mobile nodes; anchor information accumulation means for accumulating second communication load prediction data predicting communication load values of each of the mobility anchors at predetermined time points is provided; and the anchor allocation means, among the plurality of mobility anchors, selects and allocates a mobility anchor, having the second communication load prediction data not greater than a predetermined load upper limit value at any time points, to a relevant mobile node based on the second communication load prediction data.

Further, according to an eleventh aspect of the present invention, there is provided a home network system and a mobility anchor allocation method realized by the home network system having a plurality of mobility anchors that accommodate a plurality of mobile nodes, register a corresponding relationship between a home address assigned to each of the mobile nodes on a home network to which each of the mobile nodes accommodated belongs and a care-of address assigned to each of the mobile nodes on an external network to which each of the mobile nodes connects at its mobility destination, and when a packet destined to each of the mobile nodes is received, transfer the packet to each of the mobile nodes based on the corresponding relationship between the addresses; and anchor allocation means for dynamically allocating any one of the plurality of mobility anchors for each of the mobile nodes; mobile node information accumulation means for accumulating first communication load prediction data predicting communication load values of each of the mobile nodes at predetermined time points is provided; and among the plurality of mobility anchors, the anchor allocation means selects and allocates a mobility anchor, having the first communication load prediction data not greater than a predetermined load upper limit value at any time points, to a relevant mobile node based on the first communication load prediction data.

Meritorious effects of various aspect of the present invention are mentioned below, however, not limited thereto.

According to the structure of the present invention, an appropriate mobility allocation can be performed since the anchor allocation means derives the third communication load prediction data predicting communication load values of each mobility anchor at a plurality of time points when a relevant mobile node is accommodated based on the first communication load prediction data predicting communication load values of each mobile node at the plurality of time points and the second communication load prediction data predicting communication load values of each mobility anchor at the plurality of time points, and among the plurality of mobility anchors, selects and allocates a mobility anchor having the third communication load prediction data not greater than a predetermined load upper limit value at all the times and the smallest maximum value of the second communication load prediction data for the relevant mobile node. Further, since each mobility anchor is allocated based on the third communication load prediction data calculated for each time point, the mobile nodes of subscribers who communicate at different hours are accommodated by each mobility anchor, the loads are distributed over time, and the number of mobile nodes that can be accommodated by each mobile node can be increased, reducing the number of mobility anchors.

Further, since the subscriber information accumulation server records the mobile node ID of a frequently communicating partner who communicates with the subscriber of a relevant mobile node and each mobility anchor selects and accommodates mobile nodes that frequently communicate with each other based on the mobile node ID of the frequently communicating partner and an actual communication load history corresponding to the mobile node ID, a communication that goes through a plurality of mobility anchors can be avoided, improving the communication efficiency.

Further, when a mobility anchor of each home network system is allocated to a mobile node having the first communication load prediction data accumulated in the mobile node information accumulation means of a different home network system from the home network system, since the anchor allocation means of the home network system accesses a different home network system via networks and refers to the first communication load prediction data corresponding to the mobile node, the same effects as those described above can be achieved, for instance, when the mobile node receives a roaming service. Further, when a mobility anchor of each home network system is allocated to a mobile node having the first communication load prediction data accumulated in the mobile node information accumulation means of a different home network system from the home network system, since the anchor allocation means of the home network system accesses the different home network system via networks and has communication results of the mobile node in the home network system reflected on its first communication load prediction data, the same effects as those described above can be achieved, for instance, when the mobile node receives a roaming service.

BRIEF DESCRIPTION OF THE DRAWINGS

FIG. 2 is a diagram showing an example of a subscriber information table held by a subscriber information accumulation server 14.

FIGS. 4A and 4B are drawings showing the initial values of the communication load prediction data.

FIG. 5 is a drawing showing an example of an anchor information table held by an anchor information accumulation server 15.

FIG. 9 is a drawing showing a subscriber information table for realizing a mobility anchor allocation method according to a second exemplary embodiment of the present invention.

Figure 1:
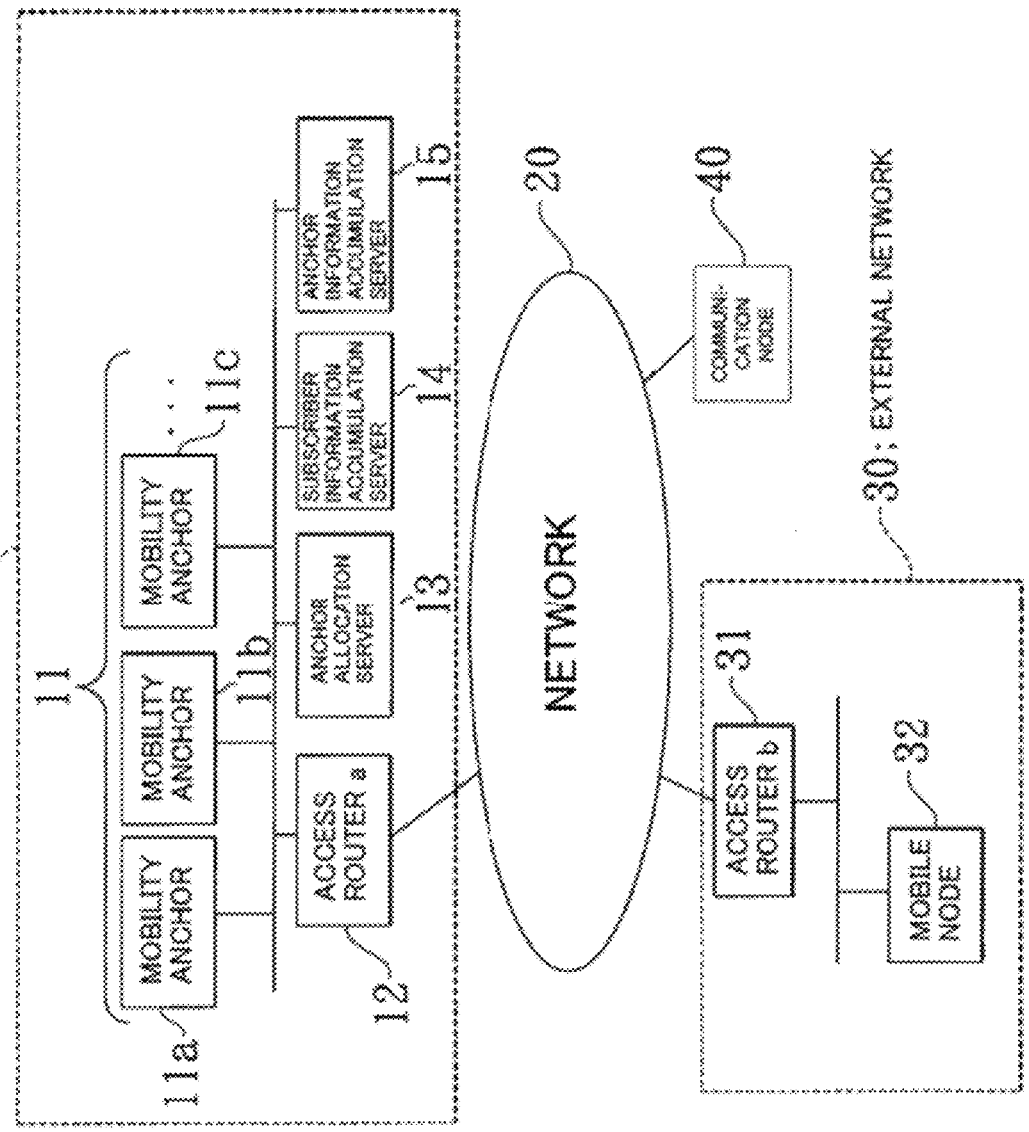
FIG. 1 is a schematic diagram showing an environment in which a home network system of a first exemplary embodiment of the present invention is used.

EXPLANATIONS OF SYMBOLS 10, 50: home network system
11, 51: mobility anchor
13, 53: anchor allocation server (anchor allocation means)
14, 54: subscriber information accumulation server (mobile node information accumulation means)
15, 55: anchor information accumulation server (anchor information accumulation means)
20, 60: network
30, 70: external network
32: mobile node
56: address management server (a part of the home network system)

DETAILED DESCRIPTION OF THE PREFERRED MODES

There is provided a home network system and mobility anchor allocation method used in the home network system in which, based on first communication load prediction data predicting a communication load value of a mobile node for each predetermined time and second communication load prediction data predicting a communication load value of each mobility anchor for each predetermined time, third communication load prediction data predicting a communication load value of each mobility anchor for each predetermined time when the mobility anchor accommodates the mobility node is derived and among a plurality of mobility anchors, a mobility anchor having the third communication load prediction data not greater than a predetermined load upper limit value at all the times and the smallest maximum value of the second communication load prediction data is selected and allocated to the mobile node.

Exemplary Embodiment 1

FIG. 1 is a schematic diagram showing an environment in which a home network system of a first exemplary embodiment of the present invention is used.

The home network system 10 in this exemplary embodiment is connected to a network 20 as shown in the drawing. Further, an external network 30 and a communication node 40 are connected to the network 20. In the home network system 10, a plurality of mobile anchors 11 (i.e., mobility anchors 11a, 11b, 11c, ... ), an access router a 12, an anchor allocation server 13, a subscriber information accumulation server 14, and an anchor information accumulation server 15 are provided, and these are connected to each other.

The mobility anchor 11 holds an association table showing a corresponding relationship between an address on the home network to which a mobile node 32 belongs (i.e., home address, HoA) and an address allocated on the external network 30 when the mobile node 32 moves to the external network 30 (i.e., care-of address, CoA) and based on this association table, the mobility anchor 11 encapsulates a packet transmitted to HoA of the mobile node 32 with the address of the mobility anchor 11 as the starting point and CoA of the mobile node 32 as the ending point, and transfers it to the mobile node 32. Further, having released the capsulation of a packet transmitted from the mobile node 21 and encapsulated with CoA of the mobile node 32 as the starting point and the address of the mobility anchor 11 as the ending point, the mobility anchor 11 transfers it to the final destination of the packet. Although the term "mobility anchor" is used in the present description, anything that functions as a mobility management server providing the services described above to the mobile node may be used.

More concretely, the mobility anchor 11 corresponds to the home agent (HA) in Mobile IPv4 standardized by IETF (Internet Engineering Task Force) RFC3344 or in Mobile IPv6 standardized by RFC3775, however, it is not limited to this. For instance, it can be considered to correspond to LMA (Local Mobility Anchor) in Netlmm (Network-based Localized Mobility Management), which similarly IETF is in the process of standardizing. In other words, the required function of the mobility anchor 11 is to maintain continuous communication even when the access router that the mobile node 32 connects to changes by receiving a packet destined to the mobile node 32 and transferring the packet so that it reaches the mobile node 32. Note that, in addition to the function of the conventional HA (home agent), the mobility anchor 11 in the present exemplary embodiment particularly has a function of transmitting information held by the mobility anchor, 11 (mobility anchors 11a, 11b, . . . ) to the subscriber information accumulation server 14 and the anchor information accumulation server 15.

In the present exemplary embodiment, the information transmitted by the mobility anchor 11 to the subscriber information accumulation server 14 is mobile node IDs and communication load information, corresponding to time information, of mobile nodes accommodated by the mobility anchor 11 (i.e., mobile nodes receiving mobility services from the mobility anchor 11). Further, the information notified to the anchor information accumulation server 15 by the mobility anchor 11 is the mobility anchor ID, the address, the upper limit of allowable load, and the communication load information, corresponding to time, of the mobility anchor 11 and mobile node IDs of mobile nodes currently accommodated. Note that the information transmitted to the subscriber information accumulation server 14 and the anchor information accumulation server 15 may be only part of the above information or may include other information. For instance, the mobile node ID may be replaced by HoA of the mobile node.

When there is a "mobility anchor allocation request" from the mobile node 32, the anchor allocation server 13 transmits a "mobility anchor allocation reply" storing the IP address of a mobility anchor that is predicted to be able to maintain the service, having a load not greater than a predetermined load upper limit value at all the times even though the communication load of the mobile node 32 is added, to the mobile node 32 based on the mobile node ID for identifying the mobile node included in the "mobility anchor allocation request," the communication load prediction data about the mobile node 32 accumulated in the subscriber information accumulation server 14, and the information on the mobility anchor 11 as an allocation candidate accumulated in the anchor information accumulation server 15. The subscriber information accumulation server 14 holds a subscriber information table recording the information of a subscriber who has signed on with the mobility service provider to receive the mobility services and the communication load prediction data of each mobile node.

FIG. 2 is a diagram showing an example of the subscriber information table held by the subscriber information accumulation server 14.

As shown in FIG. 2, this subscriber information table includes a subscriber ID for uniquely identifying each subscriber, a mobile node ID for uniquely identifying the mobile node used by each subscriber, HoA assigned to each mobile node, the rate plan of each subscriber, the occupation of each subscriber, and the age information of each subscriber. It should be noted that other information such as sex may be added to the subscriber information. Further, a part of the above information may be omitted. In the case where a static HoA is assigned to each mobile node, HoA can be recorded in the subscriber information table when a subscriber signs on, along with the other pieces of information (the rate plan, occupation, and age). Meanwhile, in the case where a dynamic HoA is assigned, HoA can be notified by the mobility anchor 11 and recorded in the subscriber information table, as soon as it has been decided. Further, HoA may be an address corresponding to either IPv4 or IPv6. As described, by configuring so that HoA and the mobile node ID can always be corresponded to each other, when for instance the anchor allocation server 13 obtains the information of a particular mobile node, it can use HoA as a search keyword instead of the mobile node ID.

Figure 3:
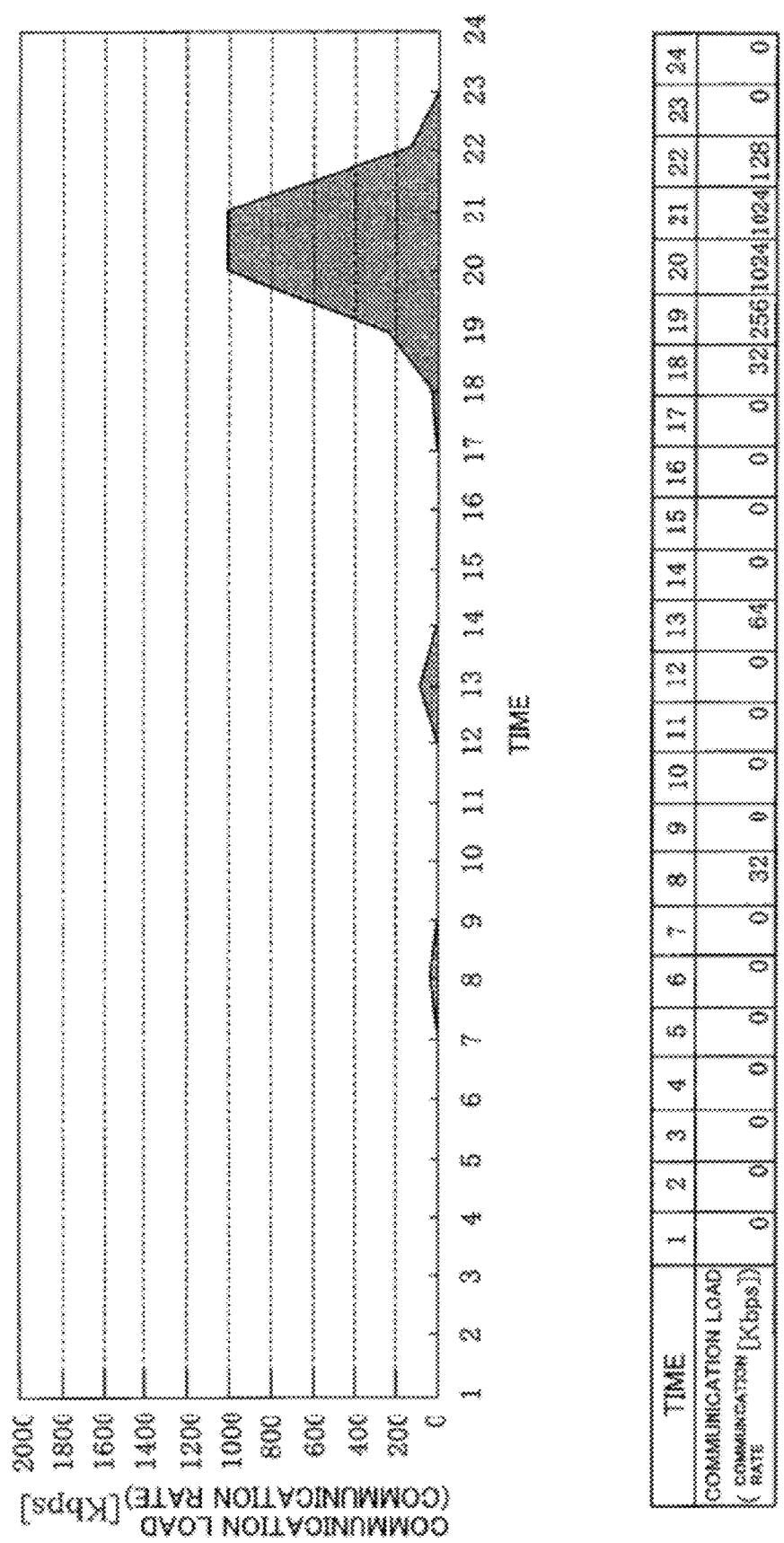
FIG. 3 is a drawing showing the communication load prediction data of each mobile node.

FIG. 3 is a drawing showing the communication load prediction data of each mobile node. As shown in FIG. 3, the communication load prediction data of each mobile node shows how much communication each mobile node is predicted to perform during the course of a day, and the communication load information notified by the mobility anchor 11 is averaged for a predetermined time unit. In FIG. 3, the communication load is expressed by average data rate per each hour, however, other indicators such as the number of packets or the total data size may be used. In this communication load prediction data, the longer the subscription period of a subscriber gets, the more accurate the value showing how much communication this subscriber performs at a given hour becomes.

The communication load prediction data is calculated using the following equation:

$$PLn[MNID][time]=(1-\alpha) \cdot PLn-1[MNID][time]+\alpha \cdot Ln[MNID][time] \quad (1)$$

Note that Pln denotes the communication load prediction data at the point of time when n number of days have passed since the date that the subscriber signed on, and Ln denotes the actual communication load data of the mobile node on the nth day since the day that the subscriber signed on and is a value notified by the mobility anchor 11. α denotes a weighting parameter, which is equal to or greater than "0" and smaller than "1." Further, the communication load prediction data PLn and the communication load data Ln are represented as two-dimensional matrices of the mobile node ID and time. Further, an initial value of the communication load prediction data at the point of signing on is generated based on the information in the subscriber information table shown in FIG. 2.

FIGS. 4A and 4B are drawings showing the initial values of the communication load prediction data.

FIG. 4A shows the initial value of the communication load prediction data (the night type) of a mobile node used by a subscriber who has chosen a communication plan (night economy plan) with an inexpensive communication fee during the night, and FIG. 4B shows the initial value of the communication load prediction data (the day type) of a mobile node used by a subscriber who has chosen a communication plan (day economy plan) with an inexpensive communication fee during the day. The maximum communication load of these mobile nodes is, for instance, 1[Mbps] (=1000[Kbps]). Further, the initial value of the communication load prediction data of a subscriber may be determined by categorizing the subscriber using the information in the subscriber information table such as "rate (fee) plan," "occupation," and "age," and basing the decision on the communication load prediction data of subscribers belonging to the same category.

FIG. 5 is a drawing showing an example of an anchor information table held by the anchor information accumulation server 15.

The anchor information accumulation server 15 holds the anchor information table shown in FIG. 5 and mobility anchor communication load prediction data, and sequentially updates the anchor information table and the communication load prediction data based on the information notified by the mobility anchor 11. The mobility anchor ID is used when one searches for mobility anchor information to be updated in the anchor information table. The mobility anchor communication load prediction data is calculated using an equation (2).

$$PLancn[AncID][time]=(1-\alpha) \cdot PLancn-1[AncID][time]+\alpha \cdot Lancn[AncID][time] \quad (2)$$

Note that PLancn denotes the communication load prediction data at the point of time when n number of days have passed since the day that the mobility anchor is installed, and Lancn the actual communication load data of the mobility anchor notified by each mobility anchor. α denotes a weighting parameter, which is equal to or greater than "0" and smaller than "1." Further, the communication load prediction data PLancn and the communication load data Lancn are represented as two-dimensional matrices of the mobile anchor ID and time. The anchor information accumulation server 15 transmits the information in the anchor information table and the information of the mobility anchor communication load prediction data to the anchor allocation server 13 in response to a request by the anchor allocation server 13. Further, the number of the mobile nodes accommodated by each mobility anchor shown in the anchor information table in FIG. 5 is, for instance, several hundreds to several thousands.

The network 20 may be the Internet or a network administered by an operator that administers the home network 10, and it is configured as a general IP network in either case. The external network 30 is connected to the network 20 via an access router b 31 and has a different network address than the home network 10. Therefore an address having a network address of the external network 30 is given to the physical network interface of the mobile node 32 connecting to the external network 30 by DHCP (Dynamic Host Configuration Protocol) and RA (Router Advertisement) of the access router b 31.

The mobile node 32 has similar functions as those of a general mobile node defined in Mobile IPv4 or Mobile IPv6, and the operations when it connects to the external network 30 and yet another external network, or the operations when it returns to the home network 10 are the same as those of the general mobile node. However, the mobile node 32 differs from the general mobile node in that the mobile node 32 asks the anchor allocation server 13 to which mobility anchor the mobile node 32 should send a registration request for associating CoA with HoA when the power of the mobile node 32 is turned on. After this, the mobile node 32 transmits the registration request to the address of the mobility anchor specified by the anchor allocation server 13, and as soon as the targeted mobility anchor receives the request, the mobility services for the mobile node 32 get started. Note that the "mobility anchor allocation request" to the anchor allocation server 13 may be transmitted at some time other than the power-on.

Further, on behalf of the mobile node 32, the access router b 31 may ask the anchor allocation server 13 which mobility anchor should be allocated and return the information such as the IP address of the mobility anchor obtained as a result to the mobile node 32 when the access router b 31 detects that the mobile node 32 has connected to the network such as when the access router b 31 receives an IP address setting request called "DHCP request" from the mobile node 32. For instance, since a packet exchanged via DHCP can store various information using options, the address of the mobility anchor can be set in the mobile node 32 by a DHCP response if an option understandable by both the access router b 31 and the mobile node 32 has been agreed on. As a result, the processing of the mobile node 32 can be simplified.

In the example described above, the access router b 31 performs the operation for obtaining the address of the mobility anchor on behalf of the mobile node 32, and the access router b 31 may further perform the transmission of the registration request (corresponding to the "Registration Request" in Mobile IPv4 or to the "Binding Update" in Mobile IPv6 and requesting the mobility anchor to make an association between HoA and CoA) to the mobility anchor allocated, usually performed by the mobile node 32, on behalf of it. Further, in this case, it is not necessary for the access router b 31 to transmit the obtained address of the mobility anchor II to the mobile node 32. Netlmm (Network-based Localized Mobility Management) and Proxy MIP (Mobile IP) have such structures. As described, there are cases where the mobile node 32 itself does not request the allocation of a mobility anchor, or does not receive the information of the mobility anchor allocated as a result, however, the mobility anchor allocation method in the present exemplary embodiment can be similarly applied to either case. Further, the "mobility anchor allocation request" transmitted by the mobile node 32 may be in a form in which the information included in the "mobility anchor allocation request" is stored in the "Registration Request" in Mobile IPv4 or the "Binding Update" in Mobile IPv6. Further, the "mobility anchor allocation reply" transmitted by the anchor allocation server 13 may be in a form in which the information included in the "mobility anchor allocation reply" is stored in the "Registration Reply" and the "Binding Acknowledgement," which are the responses to the "Registration Request" and the "Binding Update." Further, at this time, the mobility anchor 11 may take up the functions of the anchor allocation server 13, and in this case the mobile node 32 may transmit the "mobility anchor allocation request" to any mobility anchor 11 with these functions. This will create an advantage in terms of load distribution.

The communication node 40 is a general server or terminal with communication functions supporting the general IPv4 or IPv6 or both, or it may be a mobile node with the same functions as those of the mobile node 32. Further, on the home network 10, the mobility anchor 11, the access router a 12, the anchor allocation server 13, and the anchor information accumulation server 15 may be connected by a single link, i.e., an Ethernet (registered trademark) without any router, or they may be connected via a router or a plurality of them. As for the external network 30, the access router b 31 and the mobile node 32 may be connected by a single link such as a wireless LAN or an Ethernet (registered trademark), or they may be connected via a router or a plurality of them.

Figure 6:
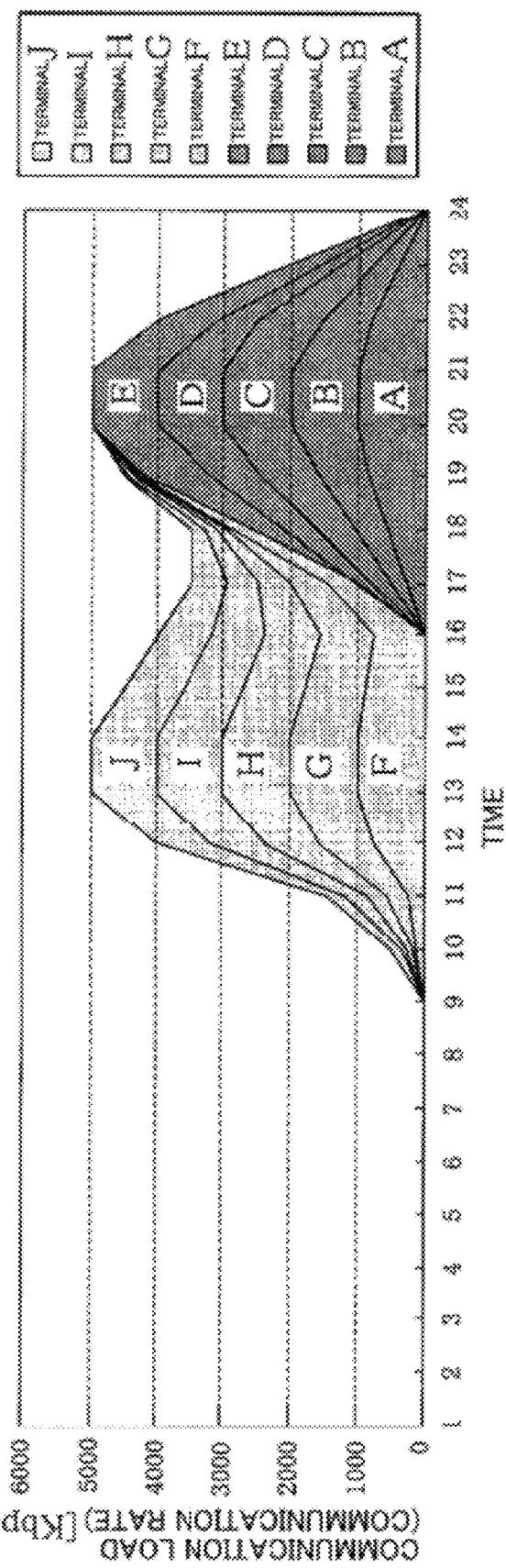
FIG. 6 is a drawing showing the addition result of the communication load prediction data shown in FIGS. 4A and 4B.
Figure 7:
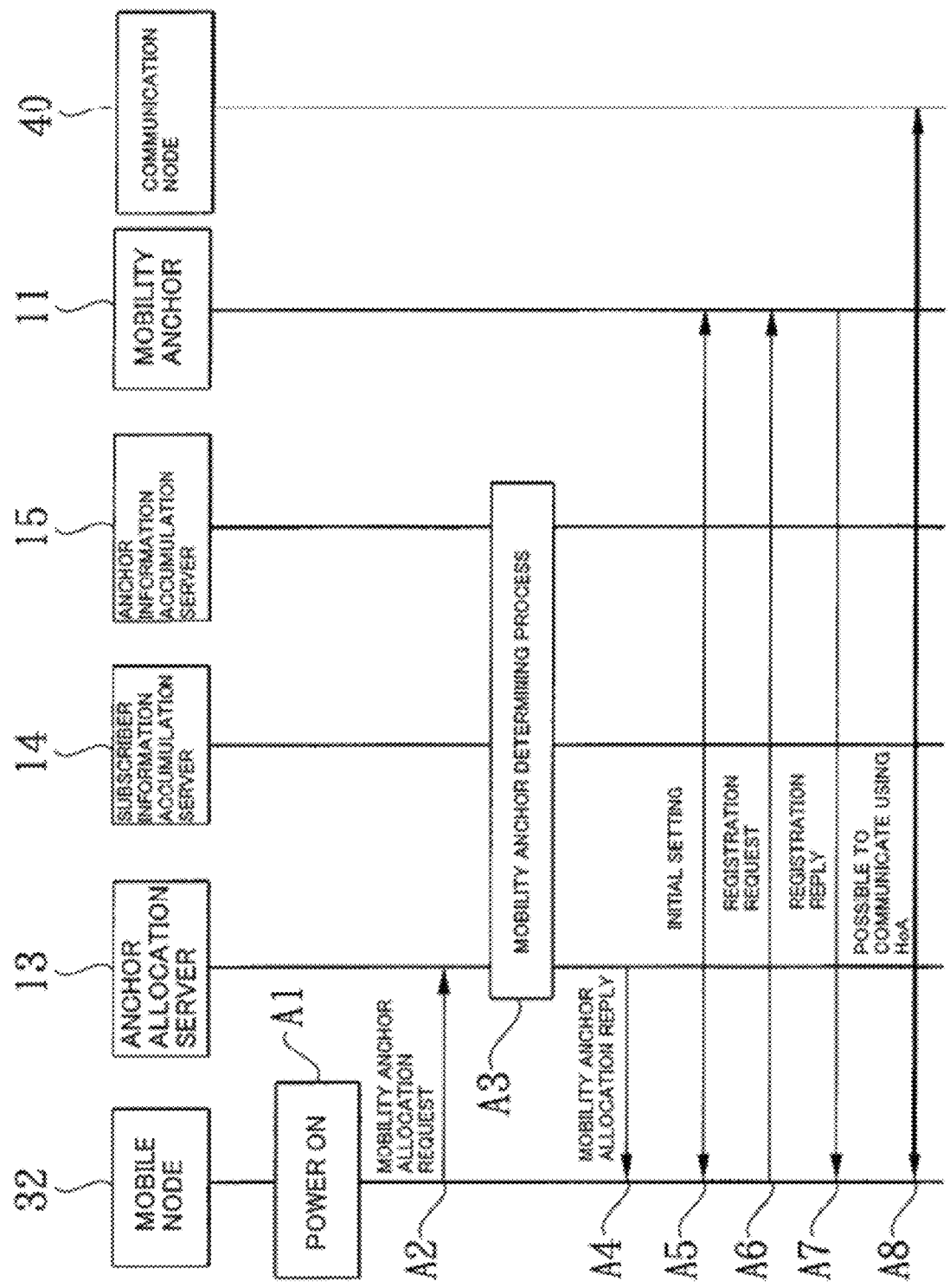
FIG. 7 is a sequence diagram for explaining the operation of a home network system 10.
Figure 8:
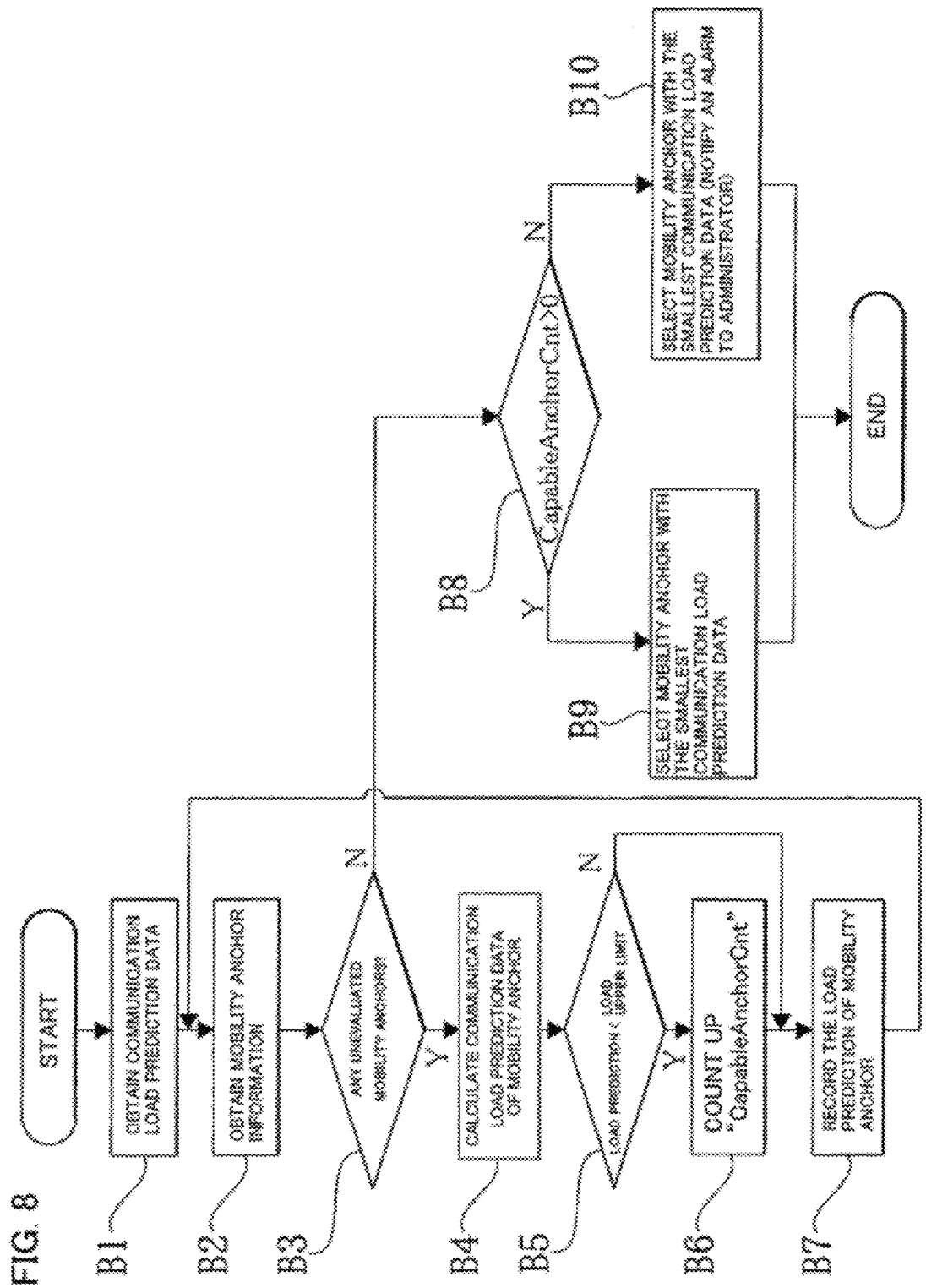
FIG. 8 is a flowchart for explaining a mobility anchor determining process shown in FIG. 7.

FIG. 6 is a drawing showing the addition result of the communication load prediction data shown in FIGS. 4A and 4B; FIG. 7 is a sequence diagram for explaining the operation of the home network system 10; and FIG. 8 is a flowchart for explaining a mobility anchor determining process shown in FIG. 7.

With reference to these drawings, the processing contents of the mobility anchor allocation method used in the home network system in this exemplary embodiment will be described.

In this home network system 10, the subscriber information accumulation server 14 accumulates first communication load prediction data predicting communication load values at a plurality of time points (for instance each predetermined time) corresponding to the communication tendencies of a subscriber using the mobile node 32 (mobile node information accumulation processing), and the anchor information accumulation server 15 accumulates second communication load prediction data predicting a communication load value of each mobility anchor 11 at each predetermined time (anchor information accumulation processing). When the mobile node 32 transmits the "mobility anchor allocation request" to the anchor allocation server 13, the anchor allocation server 13 derives third communication load prediction data by adding the first communication load prediction data and the second communication load prediction data, and among the plurality of mobility anchors 11, a mobility anchor having the third communication load prediction data not greater than a load upper limit value at all the times and the smallest maximum value of the second communication load prediction data is selected and allocated to the mobile node 32.

In other words, when the power of the mobile node 32 is turned on in the external network 30 (step A1), the mobile node 32 transmits the "mobility anchor allocation request" for determining a mobility anchor, in which the association between HoA and CoA on the external network 30 is registered, to the anchor allocation server 13 (step A2). Having received the "mobility anchor allocation request" from the mobile node 32, the anchor allocation server 13 determines which mobility anchor should be allocated to the mobile node 32 based on the mobile node ID included in the "mobility anchor allocation request" and the data accumulated in the subscriber information accumulation server 14 and the anchor information accumulation server 15 (step A3), and transmits the "mobility anchor allocation reply" storing the IP address of the selected mobility anchor to the mobile node 32 (step A4). Having received the "mobility anchor allocation reply" from the anchor allocation server 13, the mobile node 32 communicates with the mobility anchor having the mobility anchor address included in it, obtains HoA, and performs initialization regarding security (step A5). For these processings, for instance IETF standard protocol IKEv2 (Internet Key Exchange version 2 standardized by RFC4306, a key data exchange protocol used in the Internet) is used, however, other protocols may be used.

Further, having received the "mobility anchor allocation reply" from the anchor allocation server 13, the mobile node 32 transmits the "registration request" for having HoA and CoA associated with each other to the address of the mobility anchor included in it (step A6). Having received this "registration request," the mobility anchor transmits the "registration reply" indicating that the "registration request" has been received (or it has been rejected when the registration request is illegally constituted) to the mobile node 32 (step A7). Note that these "registration request" and "registration reply" respectively correspond to the "Registration Request" and the "Registration Reply" in Mobile IPv4 and also to the "Binding Update" and the "Binding Acknowledgement" in Mobile IPv6. After this, it becomes possible for the mobile node 32 to communicate with the communication node 40 using HoA (step A8).

Further, in this exemplary embodiment, the power-on of the mobile node 32 triggers the transmission of the "mobility anchor allocation request," however, as long as the mobile node 32 is not performing any communication, the mobile node 32 may send the "mobility anchor allocation request" on a regular basis and update the mobility anchor to which the "registration request" is transmitted, even if the power continues to be on. In addition to the above occasion to transmit the "registration request," this "registration request" is regularly transmitted to the mobility anchor based on the transmission conditions of the registration request defined in the aforementioned Mobile IPv4 or Mobile IPv6. Further, a characteristic of this exemplary embodiment is the procedure in which a mobility anchor is selected in the step A3, and the other procedures may be different from what is shown in FIG. 7. For instance, when Netlmm (Network-based Localized Mobility Management) is selected as a protocol to realize mobility, the access router b 31, instead of the mobile node 32, transmits the "registration request" to the mobility anchor obtained in the mobility anchor determining process (the step A3) and receives the "registration reply" as a response, however, the mobility anchor determining process in the step A3 is still the same even in this case.

In the mobility anchor determining process of the step A3, first the anchor allocation server 13 communicates with the subscriber information accumulation server 14 and obtains the communication load prediction data corresponding to the mobile node ID included in the "mobility anchor allocation request" from the mobile node 32 as shown in FIG. 8 (step B1). For instance, when the mobile node ID is "MNID_A," the communication load prediction data PLn[MNID_A][time] is obtained using the equation (1). Next, the anchor allocation server 13 communicates with the anchor information accumulation server 15 and obtains one of many pieces of the mobility anchor information accumulated in the anchor information accumulation server 15 (step B2). This obtained mobility anchor information is the information indicated in the anchor information table in FIG. 5. Further, the anchor allocation server 13 also obtains the communication load prediction data of the mobility anchor. For instance, when the mobility anchor ID is "AncID_A," PLancn[AncID_A][time] is obtained. At this time, if the anchor allocation server 13 has obtained all the mobility anchor information accumulated in the anchor information accumulation server 15, the anchor information accumulation server 15 transmits a notification indicating "complete" to the anchor allocation server 13. Next, whether or not mobility anchors that should be evaluated (unevaluated mobility anchors) still remain is determined (step B3), and when they do, the process proceeds to step B4.

In the step B4, the communication load prediction data in the case where the mobility anchor corresponding to the mobility anchor information read out in the step B2 is allocated for the mobile node 32 is calculated using an equation (3).

$$PL\_anc'[time]=PL\_anc[time]+PL\_mn[time] \qquad (3)$$

Here, PL_anc[time] is the communication load prediction data of the mobility anchor at a point of time when the mobile node 32 is accommodated. Further, PL_mn[time] is the communication load prediction data (PLn[MNID_A][time] in the above example) of the mobile node 32 obtained from the subscriber information accumulation server 14 in the step B1, and PL_anc[time] is the mobility anchor communication load prediction data at a point of time when it is obtained from the anchor information accumulation server 15 (PLancn[AncID_A][time] in the above example). This PL_anc[time] may be derived by obtaining the communication load prediction data of each mobile node from the subscriber information accumulation server 14 using the mobile node ID information of the mobile nodes accommodated by the mobility anchor obtained from an "accommodated mobile nodes" heading of the anchor information table, and summing these pieces of data. The latter method incurs more communication and computational costs, however, a more accurate value can be obtained when the mobile nodes accommodated by the mobility anchor change often.

Next, by comparing the communication load prediction data derived from the equation (3) to the maximum load of the mobility anchor (obtained from "Max Load" in the anchor information table in FIG. 5) according to an equation (4), whether or not the mobile node 32 should be accommodated is determined (step B5). More concretely, in the case where the communication load prediction data is data at each hour, when the equation (4) holds at all the times where "time" is 1 o'clock, 2 o'clock, ..., 24 o'clock, it is determined that the mobile node 32 can be accommodated, and in all other cases, it is determined that it cannot be accommodated. Note that the "time" is not limited to 1 o'clock, 2 o'clock, ..., 24 o'clock.

$$PL\_anc'[time] < MaxLoad \quad (4)$$

When it is determined that the mobility anchor can be allocated for the mobile node 32 in the step B5, "Capable Anchor Cnt" indicating the number of allocatable mobility anchors for the mobile node 32 counts up (step B6). On the other hand, when it is determined that the mobility anchor cannot be allocated in the step B5, "Capable Anchor Cnt" does not count up. Note that "Capable Anchor Cnt" is cleared to "0" in the beginning of the anchor determining process.

For instance, assuming that the maximum communication load per mobility anchor is 5[Mbps] and that the maximum communication load of a mobile node is 1[Mbps] as shown in FIGS. 4A and 4B, the maximum number of mobile nodes allocatable to a mobility anchor is 5 (=5/1) without considering the communication load prediction data, however, as shown in FIG. 6, when the communication load prediction data of the mobile nodes corresponding to FIG. 4A (terminals A, B, C, D, and E) at each hour and the communication load prediction data of the mobile nodes corresponding to FIG. 4B (terminals F, G, H, I, and J) at each hour are added up, the loads are distributed over time, a mobility anchor is able to accommodate as many as 10 mobile nodes, and mobile nodes are efficiently accommodated by a mobility anchor.

Next, the communication load prediction value PL_anc' [time], calculated using the equation (3), when the mobile node 32 is allocated to this mobility anchor is associated with an identifier of the mobility anchor and the information indicating whether or not the mobility anchor should be allocated and determined in the step B5, and recorded in the anchor allocation server 13 (step B7). After this, the process returns to the step B2 and is repeated from the step B2 to the step B7 until there is no mobility anchor left to be evaluated.

Further, after the anchor allocation server 13 receives the notification indicating "complete" from the anchor information accumulation server 15 in the step B3 and all the mobility anchors have been judged for their appropriateness for the mobile node 32, the process proceeds to step B8. In the anchor allocation server 13, by determining whether or not "Capable Anchor Cnt" is greater than "0" (i.e., "1" or greater), whether or not there is any allocatable mobility anchor is determined (step B8). If it is determined that there is an allocatable mobility anchor in the step B8, the mobility anchor having the smallest maximum value of the communication load prediction data among the data recorded in the step B7 is selected as a candidate mobility anchor to be allocated (allocatable) to the mobile node 32 (step B9).

Further, when it is determined that there is no allocatable mobility anchor in the step B8, the "mobility anchor allocation reply" stating that there is no allocatable mobility anchor may be transmitted to the mobile node 32 in the step A4 in FIG. 7, however, in this exemplary embodiment, a mobility anchor selected by the method in the step B9 is allocated. At this time, an alarm stating that the accommodation ability of the mobility anchor is insufficient may be notified to a mobility anchor administrator via email or a method appropriate for the system. Further, a log stating the same may be recorded in the anchor allocation server 13 (step B10).

As described, in the first exemplary embodiment, when a mobility anchor is allocated to the mobile node 32, an appropriate mobility anchor may not be allocated in the method that compares the communication load information of the mobility anchors 11 (11*a*, 11*b*, ...) at that point of time and allocates a mobility anchor having a small load, however, even in such a case, by taking the communication load prediction data of the mobile node 32 and the mobility anchors 11 at each hour into consideration, an appropriate mobility anchor can be allocated. Further, since the mobile nodes of subscribers performing communication at different hours are accommodated by each mobility anchor 11 and the loads are distributed over time by allocating each mobility anchor 11 based on the communication load prediction data calculated for each hour, the number of mobile nodes accommodated by each mobility anchor 11 can be increased and as a result, the number of mobility anchor 11 can be decreased.

The present exemplary embodiment 1 describes an example in which the subscriber information accumulation server 14 and the anchor information accumulation server 15 are used and their respective communication load prediction data are added, generating the communication load prediction data, however, the method is not limited to this and the communication load prediction data of either the subscriber information accumulation server 14 or the anchor information accumulation server 15 may be used.

For instance, when the subscriber information accumulation server 14 is not provided, the communication load prediction data is generated based on the information table accumulated in the anchor information accumulation server 15. Further, when the anchor information accumulation server 15 is not provided, the communication load prediction data is generated based on the information table accumulated in the subscriber information accumulation server 14.

Exemplary Embodiment 2

FIG. 9 is a drawing showing a subscriber information table for realizing a mobility anchor allocation method according to a second exemplary embodiment of the present invention.

In this exemplary embodiment, the mobility anchor determining process is further adjusted for the case where the mobile node 32 communicates with a similar mobile node. In other words, when the mobile node 32 communicates with a similar mobile node, since the communication path goes through the mobility anchors accommodating each mobile node as follows: "a mobile node A to a mobility anchor accommodating the mobile node A to a mobility anchor accommodating a mobile node B to the mobile node B," the communication efficiency deteriorates. Therefore, higher efficiency can be achieved by having mobile nodes that frequently communicate with each other accommodated by the same mobility anchor as much as possible.

In order to achieve this, a "friend" (frequently communicating partner) heading is added to the subscriber information table of the subscriber information accumulation server 14 as shown in FIG. 9, compared to the structure in FIG. 2 showing the first exemplary embodiment. In this heading, the mobile node ID (UID_X, UID_Y, . . . ) of a subscriber specified by a subscriber as someone he or she frequently communicates with at the time of joining the service are recorded. Further, each mobility anchor 11 selects mobile nodes that frequently communicate with each other and accommodates them based on the mobile node ID of the frequently communicating partner and an actual communication load history corresponding to this mobile node ID. For instance, the frequently communicating partners may be the "family."

Figure 10:
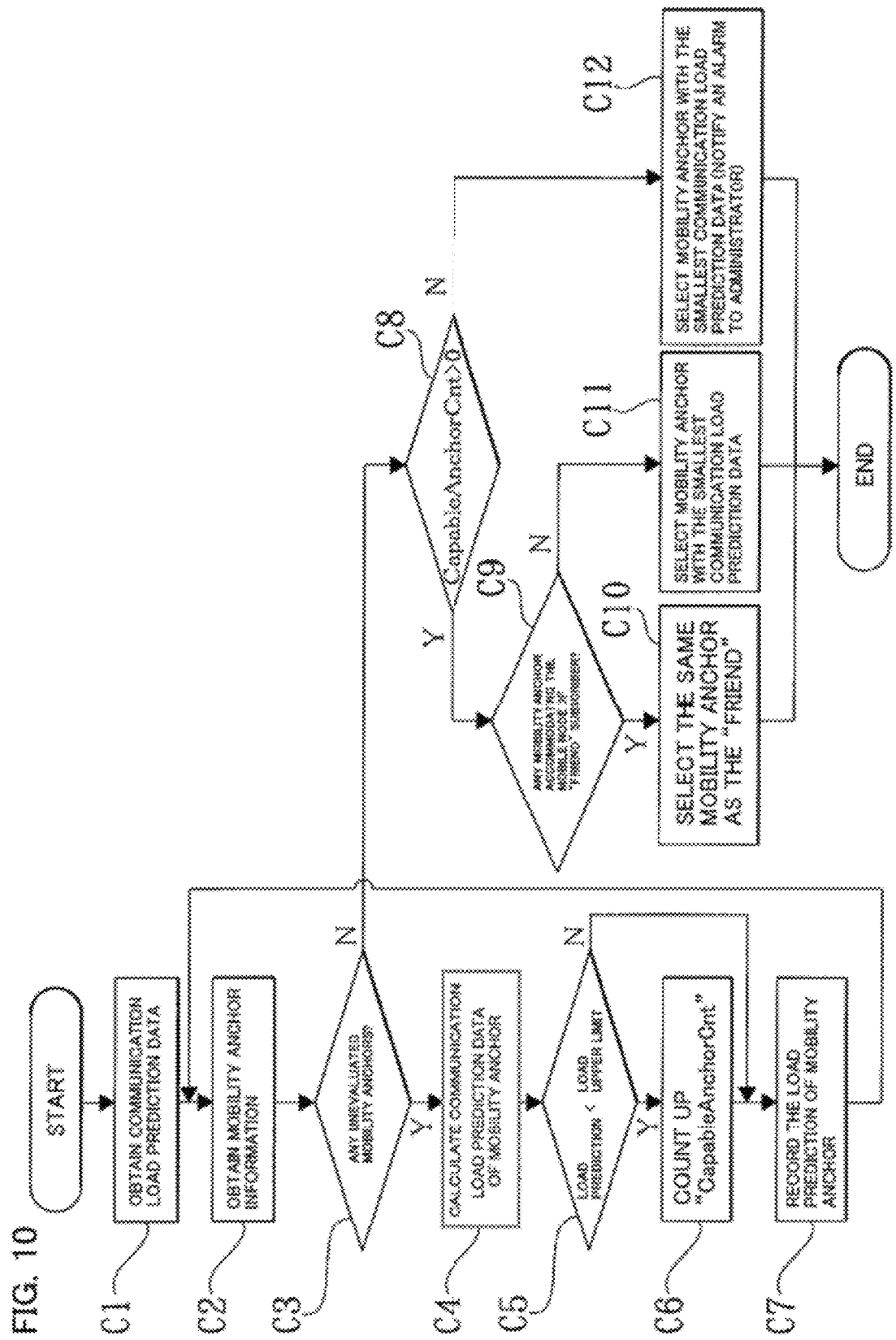
FIG. 10 is a flowchart showing a mobility anchor determining process in a home network system in this exemplary embodiment.

FIG. 10 is a flowchart showing a mobility anchor determining process in the home network system in this exemplary embodiment.

With reference to the drawing, the processing contents of the mobility anchor allocation method used in the home network system of this exemplary embodiment will be described.

In this exemplary embodiment, the same processings as those shown in FIG. 7 are performed except for the step A3 of the first exemplary embodiment in FIG. 7. In other words, in the step A3, the processing that takes the mobile nodes of parties predicted to have high frequency of communication into consideration is performed. In this case, as shown in FIG. 10, processings in steps C1 to C8 are the same as those in the steps B1 to B8 of the first exemplary embodiment in FIG. 8. However, in the step C7, in addition to the information on the communication load prediction data recorded in the step B7, a flag indicating whether or not this mobility anchor accommodates the mobile node of a communication partner set in the "friend" heading is recorded. Whether or not the mobility anchor accommodates the mobile node of a "friend" is determined by obtaining the mobile node ID of a subscriber specified as a "friend" from the subscriber information table of the subscriber information accumulation server 14, and checking whether or not this mobile node ID is included in the "accommodated mobile nodes" heading of the anchor information table based on the aforementioned flag.

When "Capable Anchor Cnt" is greater than "0" in the step C8, i.e., when it is determined that there are some allocatable mobility anchors, whether or not there is any mobility anchor accommodating a mobile node specified as a "friend" among the allocatable mobility anchors is determined using the information (flag) recorded in the step C7 (step C9). As a result, when there is an allocatable mobility anchor that also accommodates a mobile node specified as a "friend" (Yes in the step C9), this mobility anchor is selected as the mobility anchor allocated for the mobile node 32 (step C10), ending the mobility anchor determining process.

On the other hand, when there is no mobility anchor that accommodates a mobile node specified as a "friend" among the allocatable mobility anchors (No in the step C9), the maximum value of the communication load prediction data of each mobility anchor is compared to each other, and the mobility anchor having the smallest maximum value is selected as the mobility anchor allocated for the mobile node 32, ending the mobility anchor determining process (step C11).

Further, when "Capable Anchor Cnt" is "0" in the step C8, i.e., when it is determined that there is no allocatable mobility anchor (No in the step C8), a reply stating that there is no allocatable mobility anchor may be transmitted to the mobile node 32 after ending the mobility anchor determining process, however, in this exemplary embodiment, a mobility anchor selected by the method in the step C11 is allocated. In this case, an alarm stating that the accommodation ability of the mobility anchor is insufficient may be notified to a mobility anchor administrator via email or a method appropriate for the system. Further, a log stating the same may be recorded in the anchor allocation server 13 (step C12).

Further, in this exemplary embodiment, the "friend" in FIG. 9 is one person, however, it may be a plurality of persons. Further, it may be configured so that the mobility anchor records the amount of communication between the mobile nodes, and when the communication amount is equal to or greater than a predetermined threshold value, these two mobile nodes are treated as the "friends" and accommodated by the same mobility anchor as much as possible.

As described, since mobile nodes that frequently communicate with each other are accommodated by the same mobility anchor as much as possible in this second exemplary embodiment, a communication that goes through two mobility anchors can be avoided, improving the communication efficiency.

Exemplary Embodiment 3

Figure 11:
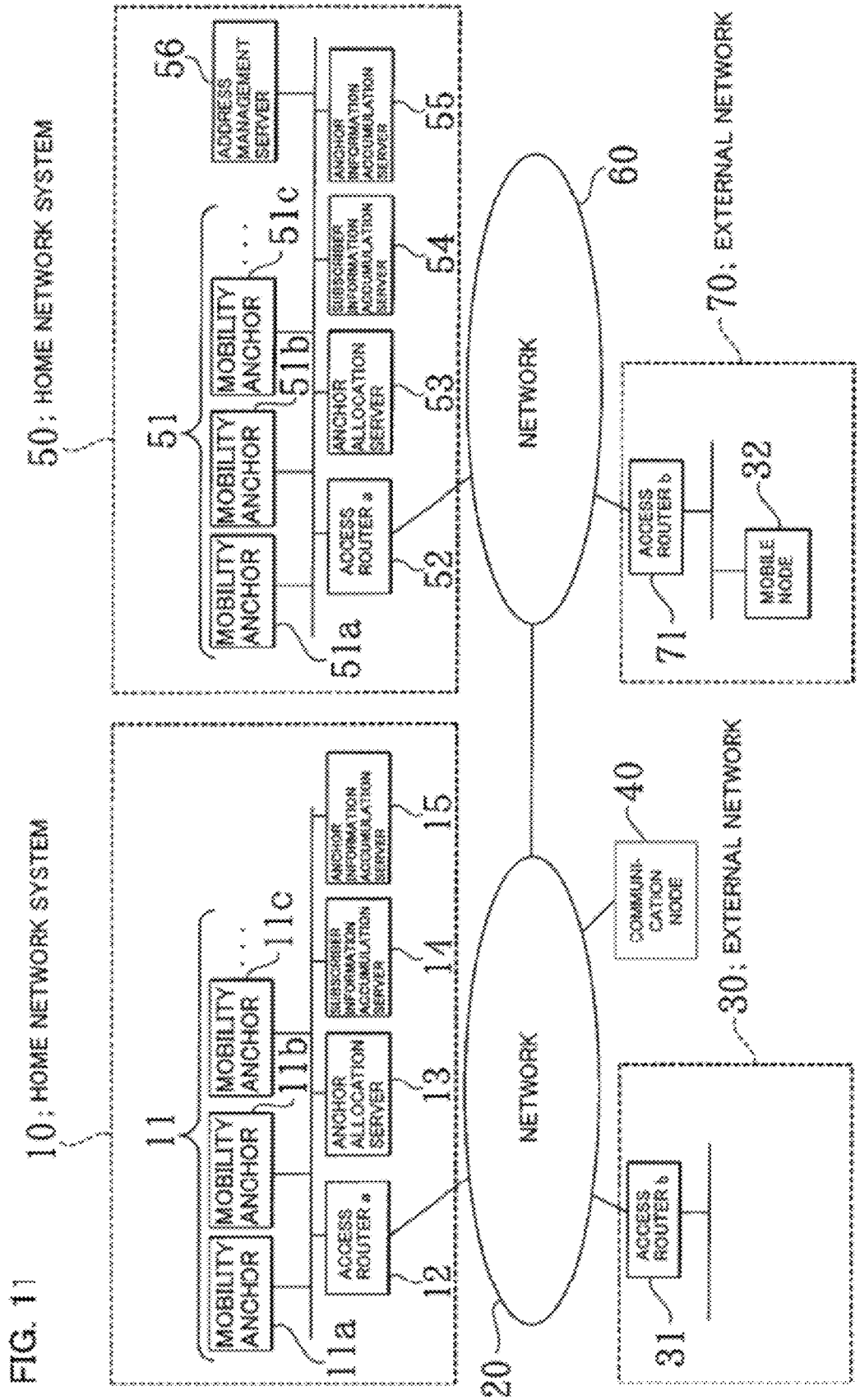
FIG. 11 is a schematic diagram showing an environment in which a home network system of a third exemplary embodiment of the present invention is used.

FIG. 11 is a schematic diagram showing an environment in which a home network system of a third exemplary embodiment of the present invention is used, and elements identical to those in FIG. 1 showing the first exemplary embodiment are given the same symbols.

In the home network system of this exemplary embodiment, as shown in FIG. 11, a homework system 50 is newly provided and is connected to a network 60. Further, an external network 70 is connected to the network 60, and the network 60 is connected to the network 20. The home network system 50 comprises a plurality of mobility anchors 51 (i.e., mobility anchors 51*a*, 51*b*, 51*c*, . . . ), an access router a52, an anchor allocation server 53, a subscriber information accumulation server 54, and an anchor information accumulation server 55 (each having the same functions as those of the corresponding element). Further, an address management server 56 is newly provided and they are connected to each other.

As the network 20, the network 60 is the Internet or a network administered by an operator that administers the home network 50, and it is configured as a general IP network. The external network 70 is connected to the network 60 via an access router b71 and has a different network address than the home network 50. Further, in this exemplary embodiment, the mobile node 32 in FIG. 1 has moved to this external network 70 and is connected to it.

This home network system (called "the second home network system" hereinafter in order to distinguish it from the home network systems 10 and 50) is used when a mobility anchor operated by an operator (or provider) different from the operator (provider) whom the user of the mobile node 32 has subscribed to is allocated for the mobile node 32. Here, the home network 10, the network 20, and the external network 30 are operated by an operator a, and the home network system 50, the network 60, and the external network 70 are operated by an operator b. Further, when the mobile node 32 is connected to the external network 70 operated by the operator b, a mobility anchor operated by the operator b is allocated. Since the network 20 and the network 60 are connected, the both networks operated by the operators a and b are able to communicate with each other.

In order to achieve this, the anchor allocation server 53 has a function of accessing a subscriber information accumulation server belonging to a different home network system and determining which mobility anchor should be allocated, in addition to the functions of the anchor allocation server 13. In other words, when the "mobility anchor allocation request" is issued by the mobile node 32, the anchor allocation server 53 has added functions of determining the operator (in this case the operator a) whom the user of the mobile node 32 subscribes to, and communicating with the subscriber information accumulation server 14 operated by the operator a via the networks 60 and 20, and the anchor allocation server 53 further has functions of reading the communication load prediction data of this user from the subscriber information accumulation server 14, and based on this, allocating one of the mobility anchors 51 belonging to the home network system 50. In this case, the "mobility anchor allocation request" from the mobile node 32 includes an operator identifier for identifying the operator whom the mobile node 32 subscribes to. The operator identifier uses, for instance, a domain name such as "operator_a.sample.net," however, it is not limited to this.

Further, when receiving the "mobility anchor allocation request" including the operator identifier from the mobile node 32, the anchor allocation server 53 has a function of obtaining the IP address of the subscriber information accumulation server 14 by transmitting a "subscriber information accumulation server address request" including the operator identifier to the address management server 56. Here, the IP address of the subscriber information accumulation server 14 is directly obtained from the address management server 56, however, it may be obtained in FQDN (Fully Qualified Domain Name) format based on domain names and IP addresses managed by a general DNS (Domain Name System) server. By doing so, the cases where the target, which is the IP address of the subscriber information accumulation server 14, changes or the loads are distributed by associating a plurality of IP addresses with a single FQDN can be dealt with. The FQDN may be, for instance, "userdata_server.operator_a.sample.net." Further, the anchor allocation server 53 has functions of associating the obtained IP address or FQDN of the subscriber information accumulation server 14 with the mobile node ID of the mobile node 32 and notifying it to the subscriber information accumulation server 54.

Further, the subscriber information accumulation server 54 has added functions of associating the communication load data of the mobile node 32 with time information, accessing a different home network system, and transmitting the information to the subscriber information accumulation server belonging to that home network system. In other words, the subscriber information accumulation server 54 has the function of transmitting the communication load data of a mobile node notified by the mobility anchor 51, in addition to the mobility anchor 11, to the subscriber information accumulation server 14 operated by the operator a via the networks 60 and 20. When the address of the subscriber information accumulation server 14, which is the destination, is obtained, the mobile node ID and the operator identifier of the mobile node 32 transmitted from the anchor allocation server 53 are used. By these functions of the subscriber information accumulation server 54, the communication load data of the mobile node 32 can be updated even when the user of the mobile node 32 is receiving a roaming service on the network operated by the other operator b.

The address management server 56 accumulates addresses, permitted to roam, in the subscriber information accumulation server 14 of the operator a, and responds to the "subscriber information accumulation server address request" from the anchor allocation server 53 with the IP address of the subscriber information accumulation server 14 on the network operated by the operator a based on the operator identifier included the request. In this case, instead of sending the IP address directly, it may respond in FQDN format. Further, instead of the home network system 10, a home network system configured identically to the home network system 50 may be provided.

Figure 12:
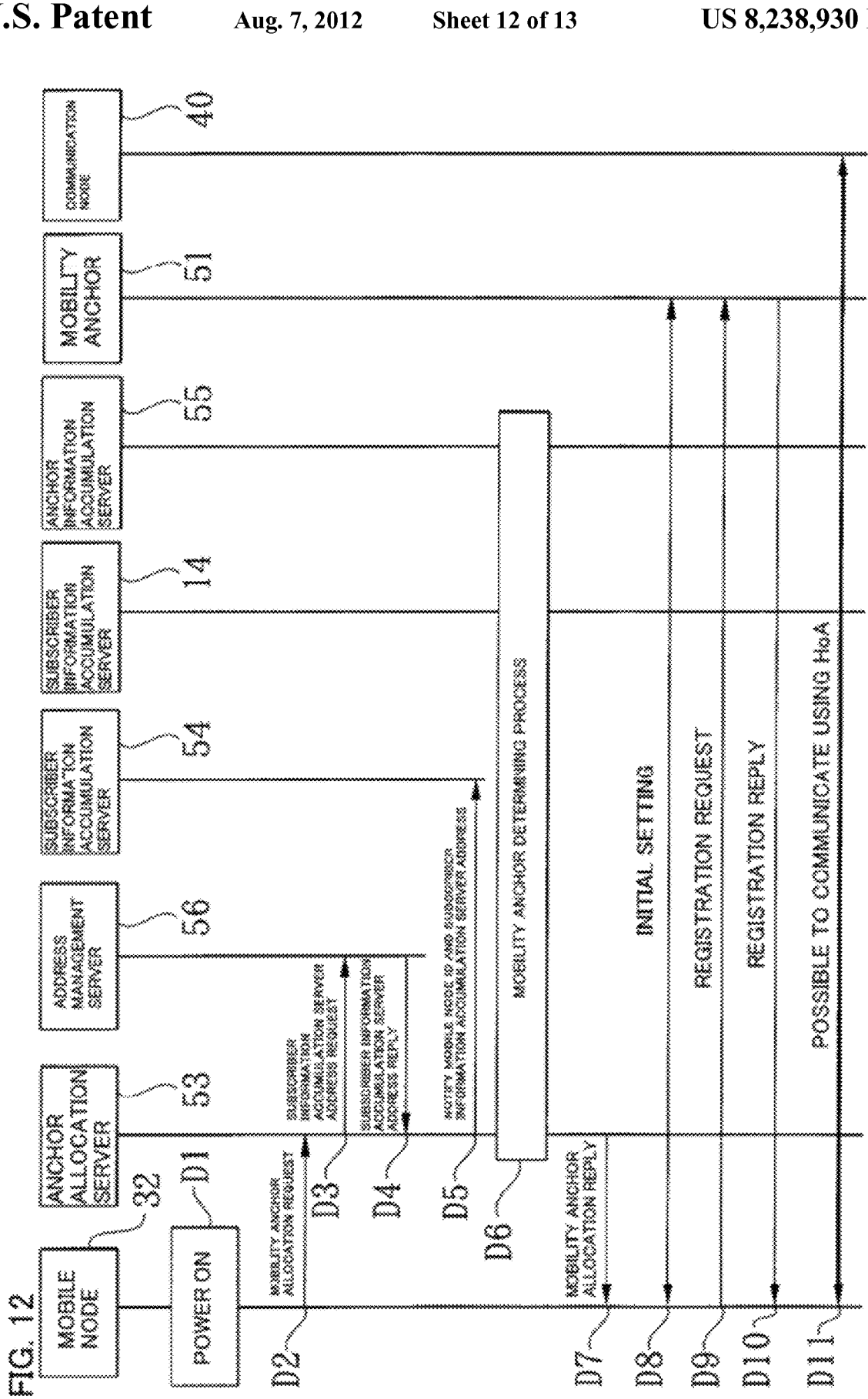
FIG. 12 is a sequence diagram for explaining the operation of the home network system in FIG. 11.
Figure 13:
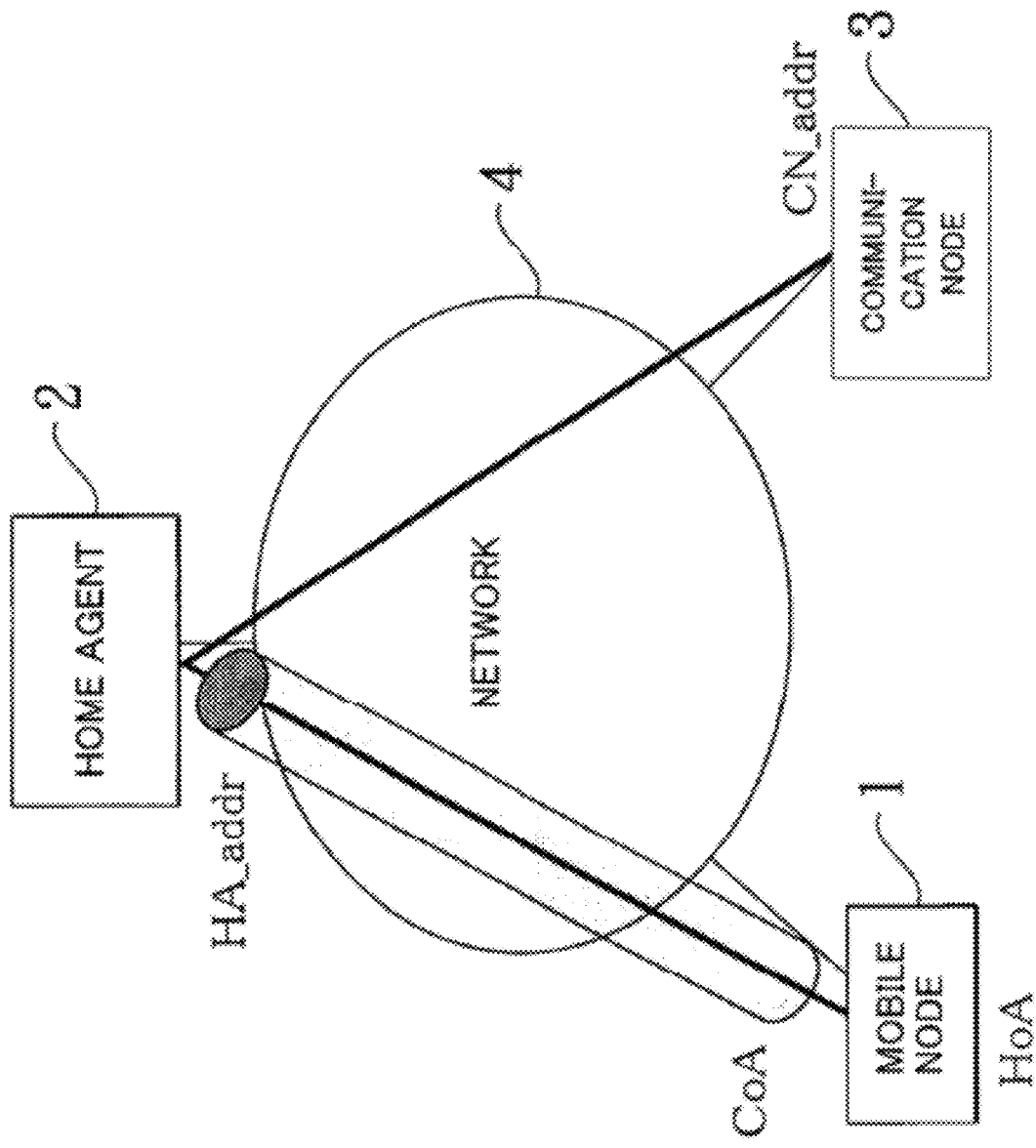
FIG. 13 is a schematic diagram for explaining an environment in which the Mobile IP is used.

FIG. 12 is a sequence diagram for explaining the operation of the home network system in FIG. 11.

With reference to this diagram, the processing contents of a mobility anchor allocation method used in the home network system of this exemplary embodiment will be described.

In this home network system, when the mobility anchor 51 in the home network system 50 is allocated for the mobile node 32 having its subscriber information accumulated in the subscriber information accumulation server 14 in the home network system 10 different from the home network system 50 (i.e., signing with the operator who manages the home network system 10), access to the home network system is made via the networks 60 and 20, the first communication load prediction data corresponding to the mobile node 32 is referred to, and communication results of the mobile node 32 in the home network system 50 are reflected on the first communication load prediction data.

In other words, when the power of the mobile node 32 is turned on in the external network 70 (step D1), the mobile node 32 transmits the "mobility anchor allocation request" for determining a mobility anchor, in which the association between HoA and CoA on the external network 70 is registered, to the anchor allocation server 53 (step C2). This "mobility anchor allocation request" further includes the operator identifier for identifying the operator a the mobile node 32 subscribes to, in addition to the mobile node ID, which is the same one as in the first exemplary embodiment.

Having received the "mobility anchor allocation request" from the mobile node 32, the anchor allocation server 53 transmits the "subscriber information accumulation server address request" including the operator identifier included in the "mobility anchor allocation request" to the address management server 56 (step D3).

Having received the "subscriber information accumulation server address request" sent from the anchor allocation server 53, the address management server 56 searches for the corresponding relationship between the operator identifier recorded in the address management server 56 and the address of the subscriber information accumulation server 14 operated by the operator a corresponding to this operator identifier using the operator identifier included in the request as a search key, and when an entry matching to the operator identifier being searched for is found, a response is sent to the anchor allocation server 53 with the address of the subscriber information accumulation server 14 associated with the operator identifier (step D4). Here, the address of the subscriber information accumulation server 14 is sent, however, a FQDN indicating the subscriber information accumulation server 14 may be transmitted. In this case, an association between the operator identifier and the FQDN of the subscriber information accumulation server operated by the operator a indicated by this operator identifier is recorded in the address management server 56.

Further, when there is no entry matching the operator identifier being searched for in the address management server 56, the address management server 56 sends a response indicating that there is no matched entry to the anchor allocation server 53. Having received the response, the anchor allocation server 53 may send a notification indicating that "no mobility anchor can be allocated" to the mobile node 32 or it may do nothing. In either case, the process ends in step D5.

Next, the anchor allocation server 53 notifies association information between the mobile node ID obtained when the "mobility anchor allocation request" is received in the step D2 and the address of the subscriber information accumulation server 14 obtained in the step D4 to the subscriber information accumulation server 54. Using this association information, the subscriber information accumulation server 54 transmits the communication load information of the mobile node 32 at the time of roaming to the subscriber information accumulation server 14 of the operator a, which is the roaming source. Further, the anchor allocation server 53 determines the mobility anchor that should be allocated for the mobile node 32 based on the mobile node ID of the mobile node 32 and information accumulated in the subscriber information accumulation server 14 having the address of the subscriber information accumulation server obtained in the step D4 and the anchor information accumulation server 55 (step D6). The mobility anchor determining process in the step D6 is the same as the mobility anchor determining process shown in FIG. 8 (Exemplary embodiment 1) or FIG. 10 (Exemplary embodiment 2), except for the fact that the subscriber information accumulation server 14 operated by an external operator is used. When the FQDN of the subscriber information accumulation server 14 is sent as the reply in the step D4, the anchor allocation server 53 obtains the address of the subscriber information accumulation server 14 from the FQDN using a general DNS structure.

After the anchor allocation server 53 determines the mobility anchor that should be allocated for the mobile node 32 in the step D6, the "mobility anchor allocation reply" storing the address of this mobility anchor is transmitted to the mobile node 32 (step D7). Having received the "mobility anchor allocation reply" from the anchor allocation server 53, the mobile node 32 communicates with the mobility anchor having the mobility anchor address included in this reply, obtains HoA, and performs initialization regarding security (step D8). In this case, for instance, IETF standard protocol IKE v2 (Internet Key Exchange version 2, defined in RFC4306) is used, but a different protocol may be used.

Next, the mobile node 32 transmits the "registration request" for having HoA and CoA associated with each other to the mobility anchor allocated (step D9). Having received this "registration request," the mobility anchor transmits the "registration reply" indicating that the "registration request" has been received (or it has been rejected when the registration request is illegally constituted) to the mobile node 32 (step D10). Note that these "registration request" and "registration reply" respectively correspond to the "Registration Request" and the "Registration Reply" in Mobile IPv4 and also to the "Binding Update" and the "Binding Acknowledgement" in Mobile IPv6. After the step D10, it becomes possible for the mobile node 32 to communicate with the communication node 40 using HoA (step D11).

In this exemplary embodiment, a subscriber information accumulation server operated by a different operator is used, and one of cases where the home network system of this (second) exemplary embodiment is used effectively is when the user of a terminal subscribed to a domestic operator receives a roaming service on the network of an overseas operator affiliated with the aforementioned domestic operator.

As described, in this third exemplary embodiment, the same benefits as those of the first exemplary embodiment can be achieved in a state in which the mobility anchor 51 of the home network system 50 is allocated for the mobile node 32 having its subscriber information accumulated in the subscriber information accumulation server 14 of the home network system 10, which is a different network from the home network system 50.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

For instance, when the mobility protocol for realizing mobile communication is Mobile IPv4 or Mobile IPv6, the mobility anchors 11 and 51 correspond to HA (Home Agent). When the mobility protocol is Netlmm (Proxy MIPv6), the mobility anchors 11 and 51 correspond to LMA (Local Mobility Anchor) and the access router b (a configuration using an access router a is possible) corresponds to MAG (Mobility Access Gate). Further, when the mobility protocol is Proxy MIP (Proxy MIPv4), under consideration by IETF, the mobility anchors 11 and 51 correspond to HA and the access router b (a configuration using an access router a is possible) corresponds to MPA (Mobile Proxy Agent). As described, despite the nomenclature differences in each mobility protocol and other differences such as whether the node that registers to the mobility anchor when it connects to or moves to a network is a terminal or an access router, the characteristic of the present invention, which is that a mobility anchor is allocated based on the subscriber information and communication results of the user, can be applied in any mobility protocol.

INDUSTRIAL APPLICABILITY

The present invention is effective when it is applied to a mobile telephone network using IP.

The invention claimed is:

1. A home network system having:
 a plurality of mobility anchors that accommodate a plurality of mobile nodes, register a corresponding relationship between a home address assigned to each of said mobile nodes on a home network to which each of said mobile nodes accommodated belongs and a care-of address assigned to each of said mobile nodes on an external network to which each of said mobile nodes connects at its mobility destination, and when each of said mobile nodes is connected to said external network and a packet destined to each of said mobile nodes is received, transfer said packet to each of said mobile nodes based on the corresponding relationship between said addresses; and
 anchor allocation means for dynamically allocating any one of said plurality of mobility anchors to each of said mobile nodes; wherein the system is provided with:
 mobile node information accumulation means for accumulating first communication load prediction data predicting communication load values of each of said mobile nodes at a plurality of time points; and anchor information accumulation means for accumulating second communication load prediction data predicting communication load values of each of said mobility anchors at said plurality of time points; and wherein said anchor allocation means derives third communication load prediction data predicting communication load values of each of said mobility anchors at said plurality of time points when a relevant mobile node is accommodated based on said first communication load prediction data and said second communication load prediction data, and among said plurality of mobility anchors, selects and allocates a mobility anchor, having said third communication load prediction data not greater than a predetermined load upper limit value at all the time points and the smallest maximum value of said second communication load prediction data, to the relevant mobile node, said mobile node information accumulation means is constituted by a subscriber information accumulation server that accumulates said first communication load prediction data corresponding to communication tendencies of a subscriber of each of said mobile nodes;

said anchor information accumulation means is constituted by an anchor information accumulation server that accumulates said second communication load prediction data;

said anchor allocation means is constituted by an anchor allocation server that, when each of said mobile nodes transmits a mobility anchor allocation request, derives said third communication load prediction data by adding said first communication load prediction data and said second communication load prediction data, and among said plurality of mobility anchors, selects and allocates a mobility anchor, having said third communication load prediction data not greater than said predetermined load upper limit value at all the times and the smallest maximum value of said second communication load prediction data, to the relevant mobile node;

said subscriber information accumulation server records a mobile node ID of a frequently communicating partner who frequently communicates with a subscriber of each of said mobile nodes; and each of said mobility anchors selects and accommodates mobile nodes that frequently communicate with each other based on the mobile node ID of said frequently communicating partner and an actual communication load history corresponding to said mobile node ID.

2. The home network system as defined claim 1, wherein said subscriber information accumulation server sets an initial value of said first communication load prediction data according to communication tendencies of a subscriber of each of said mobile nodes, and sequentially updates said first communication load prediction data according to an actual communication load history; and said anchor information accumulation server sequentially updates said second communication load prediction data according to an actual communication load history.

3. A home network system formed of the home network systems, as defined in claim 1, connected to each other via a plurality of networks, wherein, when a mobility anchor of said home network system is allocated to a mobile node having said first communication load prediction data accumulated in said mobile node information accumulation means of a different home network system from said home network system, said anchor allocation means of each of said home network systems accesses said different home network system via said networks and refers to said first communication load prediction data corresponding to said mobile node.

4. A second home network system formed of the home network systems (called "first home network system(s)" hereinafter), as defined in claim 1, connected to each other via a plurality of networks, wherein, when a mobility anchor of said home network system is allocated to a mobile node having said first communication load prediction data accumulated in said mobile node information accumulation means of a different home network system from said home network system, said anchor allocation means of each of said first home network systems accesses said different home network system via said networks and has communication results of said mobile node in said home network system reflected on said first communication load prediction data.

* * * * *